(12) United States Patent
Chung et al.

(10) Patent No.: US 8,241,604 B2
(45) Date of Patent: Aug. 14, 2012

(54) METHOD FOR MAKING METAL/TITANIA PULP AND PHOTOCATALYST

(75) Inventors: Jen-Chieh Chung, Taoyuan County (TW); Yu-Zhen Zeng, Taoyuan County (TW); Yu-Chang Liu, Taoyuan County (TW); Yun-Fang Lu, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 415 days.

(21) Appl. No.: 12/571,112

(22) Filed: Sep. 30, 2009

(65) Prior Publication Data
US 2010/0105549 A1  Apr. 29, 2010

(30) Foreign Application Priority Data
Oct. 24, 2008 (TW) ............................... 97140988 A (51) Int. Cl.
*C01G 23/047* (2006.01)
(52) U.S. Cl. ........ 423/610; 423/616; 423/260; 502/350; 313/635; 313/489; 313/110
(58) Field of Classification Search .................. None
See application file for complete search history.

(56) References Cited

U.S. PATENT DOCUMENTS 6,770,257 B1 *  8/2004  Imura et al. .................. 423/610
7,327,087 B2 *  2/2008  Wang ............................. 313/635

OTHER PUBLICATIONS

JP08-099041, Kazumi et al, machine translation provided: photocatalyst of titanium oxide porous thin film and preparation of the same:, Apr. 1996.*

* cited by examiner

*Primary Examiner* — Melvin C Mayes
*Assistant Examiner* — Smita Patel
(74) *Attorney, Agent, or Firm* — Morris Manning & Martin LLP; Tim Tingkang Xia, Esq.

(57) ABSTRACT

A method for making a metal-titania pulp and photocatalyst is provided, including firstly acidically hydrolyzing a titanium alkoxide solution in presence of an alcohol solvent to get a colloidal solution; then, adding at least one metal salt solution into the colloidal solution to produce a nano-porous metal/titania photocatalyst under appropriate conditions by appropriate reaction. The nano-porous metal/titania photocatalyst thus prepared has excellent optical activity and is applicable in research of water decomposition with light to improve production efficiency of hydrogen energy. In addition, the photocatalyst is further processed in the form of powder or film to facilitate industrial application in wastewater treatment.

25 Claims, 6 Drawing Sheets

METHOD FOR MAKING METAL/TITANIA PULP AND PHOTOCATALYST

BACKGROUND OF THE INVENTION

1. Field of the Invention

The present invention relates to a method for making a pulp and catalyst, and particularly to a method for making a metal/titania pulp and photocatalyst.

2. Related Art

Use for photochemical reaction and application in industry, of semi-conductor materials, are hot research directions in recent years, mainly because special optical properties of the semi-conductor materials make wastewater treatment or energy regeneration such as hydrogen production with solar energy to become feasible. However, as a catalyst effective in photochemical reactions, a photocatalyst can absorb photo energy and thus produce electron-hole pairs only on condition that a band gap between valence band and conduction band of the photocatalyst matches with the spectrum of incident light, and the photocatalyst can be used in a catalysis, oxidation, and reduction reaction to decompose relevant compounds only on condition that the band gap matches with electric potential relevant to a chemical reaction.

Photocatalysts such as $TiO_2$, $ZnS$, $Fe_2O_3$, and $ZrO_2$ have a common property, that is, they have a wide enough energy band gap and a high enough water decomposition activity. These semi-conductor photocatalysts will have photochemical activity and capability generally only after irradiation with UV light. However, UV light is present in solar light spectrum in a low proportion of 4%, therefore, how to use solar energy effectively seems to be an important subject at present. Because visible light is present in an amount of about 43% in solar light spectrum, now scholars in each field are actively developing a photocatalyst with high activity in visible spectrum for use in catalysis of decomposition and redox reactions to explore a new way of solar energy utilization. Among relevant semi-conductor photocatalyst materials, most frequently used one is titania, mainly due to its stable properties, non-toxicity, low cost, ease availability, and good photochemical activity. However, its absorption spectrum for solar light still concentrates in UV region, so in order to more efficiently absorb solar light of visible wavelengths by titania, titania is suitably modified to achieve a wider absorption range for solar light spectrum, which will become a feasible method to efficiently improve the utilization rate of solar energy.

Titania has been widely used in various industrial applications including dyestuff, paper industry, paint, catalyst, bactericide, detergent, surface treatment, wastewater treatment, and decomposition of organic waste, etc. Recently, titania is also gradually used in advanced technology industry due to its special semi-conductor properties. Titania belongs to n-type semi-conductors and has a molecular structure of zinc-blende lattice, which can be divided into three main crystal forms, i.e. anatase, rutile, and brookite.

Generally, titania is of amorphous structure at normal temperature, and it will be present as anatase crystal form upon calcination at a temperature between 200° C. to 500° C., as rutile crystal form at a temperature between 500° C. to 600° C., and as brookite crystal form where the calcination temperature is above 700° C. Anatase and rutile will vary with temperature, so they are often used in photocatalytic reaction. The rutile crystal form is more stable, while the photo-reaction activity of anatase is better; therefore, anatase is commonly used as main raw material in many industrial applications. Because titania has an excellent photocatalyst activity and a band gap between valence band (VB) and conduction band (CB) is up to 3.0-3.2 eV, the incidence of light with an energy higher than this band gap on titania will lead to separation of electron-hole pairs, and the generated electrons and holes will recombine too. The separation and recombination of electron-hole pairs are competitive mechanisms, and where there only occurs separation of electron-hole pairs and electrons are concerned in free radical reactions respectively, the photocatalytic activity can be exhibited.

It can be found from studies in literatures that titania powders produced with different preparation methods will have different surface properties, including particle size, porosity, particle structure, and morphology etc, all of which will influence optical activity of titania. Generally, the optical activity of titania will directly affect its efficiency, for example, for decomposition and breakdown of organic components in wastewater treatment, and for electron transfer on thin film electrode in a dye sensitized solar cell.

Recently, because nano-titania powder has been widely used in various industries, and demand is continuously increased, many commercial processes for producing titania powder in large scale are successively developed, for example, Degussa P25. However, the nano-titania powder is very fine, for example, when used in an aqueous solution system for degrading organics contained therein, it is difficult to separate the nano-titania particles suspended in the solution from the aqueous phase after the reaction is complete, limiting its applications. In order to solve such a problem, formulating the prepared titania powder into a pulp and applying it onto a substrate to prepare a titania film is another feasible solution.

Methods to produce nano-titania powder generally can be divided into two general classes, i.e. first class of liquid-phase synthesis and second class of gas-phase synthesis. The first class of liquid-phase synthesis can be further divided into (1) sol-gel process: a high purity of metal alkoxide (M(OR)n) or metal salt is dissolved into a solvent such as water or alcohol, hydrolyzed, and condensed to form a gel, thereby producing a gel having several spatial structures; (2) hydrolysis process: a metal salt is subjected to forced hydrolysis in different acidic or alkaline solutions to produce uniformly dispersed nano-particles; (3) hydrothermal process: a reaction is preformed in a sealed stainless steel vessel at a particular temperature and under a particular pressure to produce nano particles; and (4) microemulsion process: a titanium-containing precursor is added into a microemulsion of water with surfactant to form a nearly monodispersed nano-sized micelle, and then dried and calcinated.

The second class of gas-phase synthesis can be divided into (1) chemical vapor deposition: a precursor is reacted with oxygen in a low-pressure chemical vapor deposition apparatus to produce a thin film or a powder; (2) flame synthesis: a metal compound supplied by a system is vapor heated with oxyhydrogen flame or oxyacetylene flame etc to produce nano particles; (3) vapor condensation: a raw material is gasified or formed into a plasma by a heating process such as vacuum evaporation, heating, or high frequency induction, and then quenched to collect a nano powder produced; and (4) laser ablation: a metal or non-metal target is gasified by a laser beam of high energy and then the vapor is condensed to obtain a stable atomic cluster in gas phase.

As described above, absorption wavelengths of solar light by the titania photocatalyst alone mainly concentrate in UV region, therefore, binding to different metal ions is a feasible means in order to improve its light absorption range, photocatalysis, reduction, and oxidation activities. Previous studies in literatures mainly focus on preparation of a desired catalyst powder by dipping, in which the prepared titania powder is soaked into different metal ion solutions, or a metal ion solution is dripped into the titania powder. In the photocatalyst powder thus prepared, generally all the metal ions are physically adsorbed or attached to surface of the titania powder, therefore, the binding strength between the metal ions and the titania powder is low and disassociation may easily occur during the reaction process, resulting in decreased light absorption and reaction effects. In order to improve such a disadvantage, the present invention utilizes a unique reaction manner in which one or more metal ions are added in a titania reaction process such that they can effectively bind to titania in the formation, whereby modified properties and improved photochemical catalytic activity of simple titania photocatalyst can be achieved, realizing its effective application in industry.

SUMMARY OF THE INVENTION

The present invention is directed to a method for making a metal/titania pulp and photocatalyst. Firstly, a metal/titania pulp prepared by the method of the present invention is coated onto a transparent substrate (e.g. indium-tin oxide conductive glass) by means of blade coating or dip coating to form a film, or the metal/titania pulp is dried and ground into a powder, and secondly, such a film-substrate or powder is placed in a glass or quartz reactor containing water as photocatalyst. In this way, light absorption efficiency for solar light or UV light can be enhanced and production effect of hydrogen energy by decomposition of water can thus be improved.

The present invention is also directed to a method for making a photocatalyst, by which a photocatalyst can be prepared which has high activity in visible spectrum and also can be used in catalysis of water decomposition to product hydrogen to explore a new pathway of solar energy utilization.

The present invention is also directed to a method for making a photocatalyst, by which a nano-porous photocatalyst can be prepared which has very excellent optical activity and is applicable in research of hydrogen production by water decomposition with light to improve production efficiency of hydrogen energy. Furthermore, the photocatalyst can be further made in the form of powder or film to facilitate industrial application in wastewater treatment.

In an embodiment, the present invention is directed to a method for making a metal/titania pulp, including: acidically hydrolyzing a titanium alkoxide solution to get a hydrolyzed solution; standing the hydrolyzed solution in an environmental state for a particular period of time to obtain a titania colloidal solution; adding at least one metal salt compound into the titania colloidal solution to form a mixed pulp; and subjecting the mixed pulp to a thermal treatment process to get a titania pulp.

In another embodiment, the present invention is directed to a method for making a photocatalyst, including: acidically hydrolyzing a titanium alkoxide solution to get a hydrolyzed solution; standing the hydrolyzed solution in an environmental state for a particular period of time to obtain a titania colloidal solution; adding at least one metal salt compound into the titania colloidal solution to form a mixed pulp; subjecting the mixed pulp to a thermal treatment process to get a titania pulp; and subjecting the titania pulp to a post-process procedure to form the photocatalyst. The post-process procedure can include drying the titania pulp and powdering, or applying the titania pulp onto a substrate.

In a further embodiment, the present invention is also directed to a method for making a photocatalyst, including: acidically hydrolyzing a titanium alkoxide solution to get a hydrolyzed solution; standing the hydrolyzed solution in an environmental state for a particular period of time to obtain a titania colloidal solution; adding at least one metal salt compound into the titania colloidal solution to form a mixed pulp; subjecting the mixed pulp to a thermal treatment process to get a titania pulp; mixing the titania pulp with a titania fluid to form a formulated pulp; and applying the formulated pulp onto a substrate.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the content of the present invention more comprehensible, the embodiments of the present invention are described below with reference to the accompanying drawings.

Figure 1A:
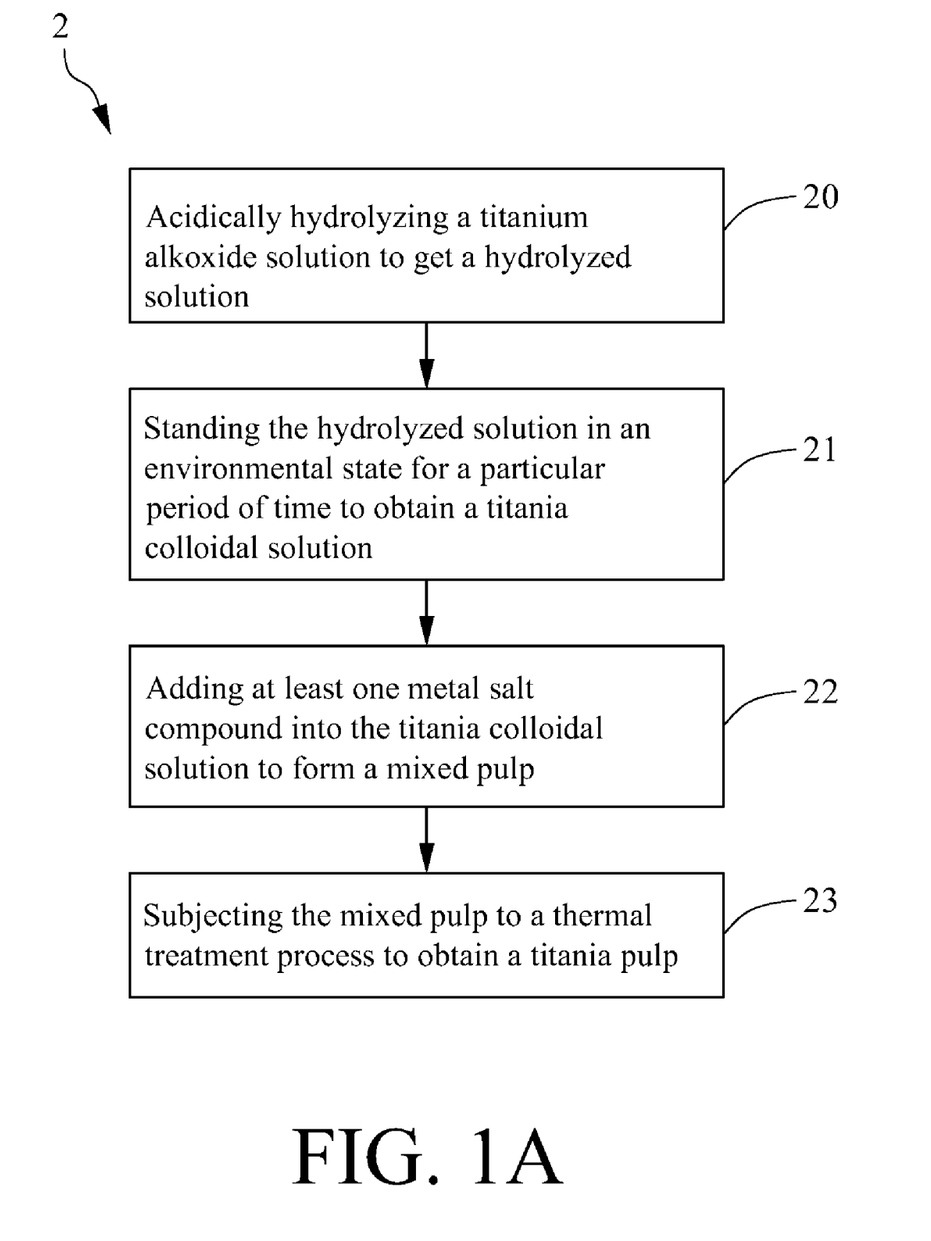
FIG. 1A is a schematic flow chart of a method embodiment for making a titania pulp according to the present invention.

Referring to FIG. 1A, it is a schematic flow chart of a method embodiment for making a titania pulp according to the present invention. In this embodiment, the method includes: performing a step 20 firstly, in which a titanium alkoxide solution is acidically hydrolyzed to get a hydrolyzed solution. In the step, the titanium alkoxide solution is prepared by mixing an alcohol solvent with a titanium alkoxide, where the titanium alkoxide is selected from titanium alkoxides having 1 to 6 carbons, for example, titanium methoxide, titanium ethoxide, titanium propoxide, titanium iso-propoxide, and titanium butoxide, with titanium ethoxide, titanium iso-propoxide, or titanium butoxide being preferred. The alcohol solvent is an alkanol having 1 to 6 carbons, for example, methanol, ethanol, propanol, iso-propanol, and butanol, with methanol, propanol, iso-propanol, or butanol being preferred. An acidic solution needed by the acidic hydrolysis is a mixed solution of an acid and water. The acid can be an organic or inorganic acid. The organic acid can be an aliphatic acid having 1 to 6 carbons, for example, but not limited to, formic acid, acetic acid, and propionic acid; and the inorganic acid can be, for example, but not limited to, nitric acid, sulfuric acid, and hydrochloric acid. In the preparation method of a metal/titania pulp according to the present invention, a molar ratio of water to titanium alkoxide should be controlled in the range of above 10 to 500, and preferably in the range of above 10 to 300; and a molar ratio of acid to titanium alkoxide should be controlled in the range of above 0.1 to 2, and preferably in the range of above 0.1 to 1. The environment where the step 20 is carried out includes mixed acid/water-alcohol solvent/titanium alkoxide at a temperature of 3 to 10° C. under atmosphere or inert gas. The inert gas (e.g. nitrogen and argon etc) is not specifically limited provided that it is not involved in the reaction.

Next, a step 21 is performed, which includes standing the hydrolyzed solution in an environmental state for a particular period of time to obtain a titania colloidal solution. In the step 21, the environmental state typically includes a temperature state of 60 to 100° C., and the standing time is about 2 to 6 h in this embodiment. Then, a step 22 is performed, in which at least one metal salt compound is added into the titania colloidal solution to form a mixed pulp. The metal salt can be selected as desired, for example, but not limited to, $AgNO_3$, $H_2PtCl_6$, or $LaNO_3$. Finally, a step 23 is performed, in which the mixed pulp is subjected to a thermal treatment process to obtain a titania pulp. In the step 23, the thermal treatment process includes maintaining the mixed pulp at a temperature of 130 to 300° C. for 10 to 24 h and then cooling. The metal/titania pulp prepared by the reaction in method 2 of the present invention has a particle size between 5 to 150 nm, and preferably between 10 to 100 nm.

EXAMPLE 1

Preparation of Mono Metal/Titania Pulp

Figure 1B:
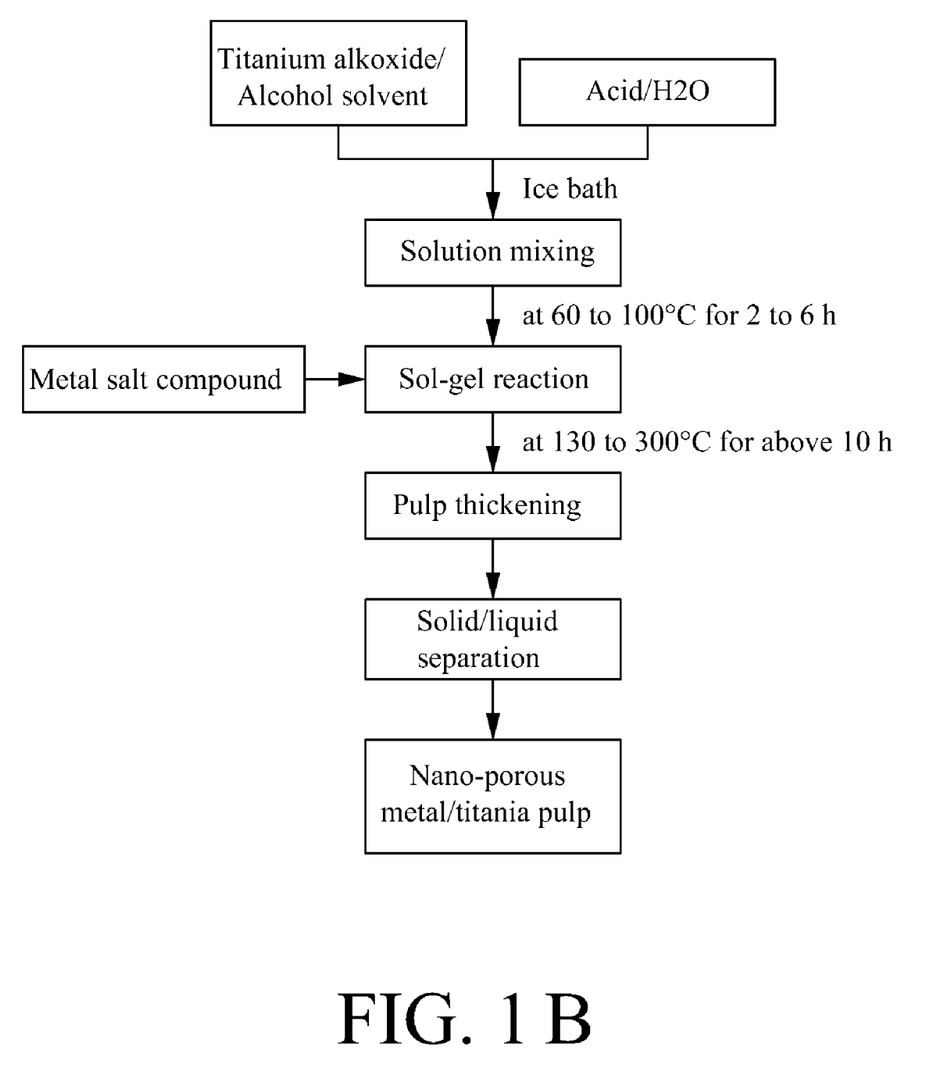
FIG. 1B is a schematic flow chart for making a mono metal titania pulp in practice according to the scheme of FIG. 1A of the present invention.

As shown in FIG. 1B, it is a schematic flow chart for making a mono metal/titania pulp in practice according to the scheme of FIG. 1A of the present invention. Firstly, 10 ml of iso-propanol was mixed with 37 ml of titanium ethoxide and placed into a 100 ml dropper. In addition, 80 ml of acetic acid was mixed with 250 ml of distilled water and placed into a 500 ml flask, which was then placed in a thermostatic bath with a temperature set at 5° C. Under nitrogen atmosphere, the mixed solution in the dropper above was dripped into the flask at a controlled rate of about two drops per second for 1 h with stirring at a constant rate. The titrated solution would appear clear, and if there were suspended substances, stirring was continued till a transparent solution was obtained. The titrated solution was placed into a thermostatic bath of 80° C. for 3 h, taken out and cooled, and then 1 g of $AgNO_3$ or another metal salt was added and mixed homogeneously. At this time, the original solution would appear jelly-like. The jelly-like titania colloid was put into an autoclave, maintained for 12 h in a high temperature oven of 190° C., and cooled to room temperature, such that the original titania colloid would form a liquid layer and a titania layer. The upper liquid layer was decanted to leave the Ag/titania layer, which was further stirred to get an Ag/titania pulp.

Figure 2:
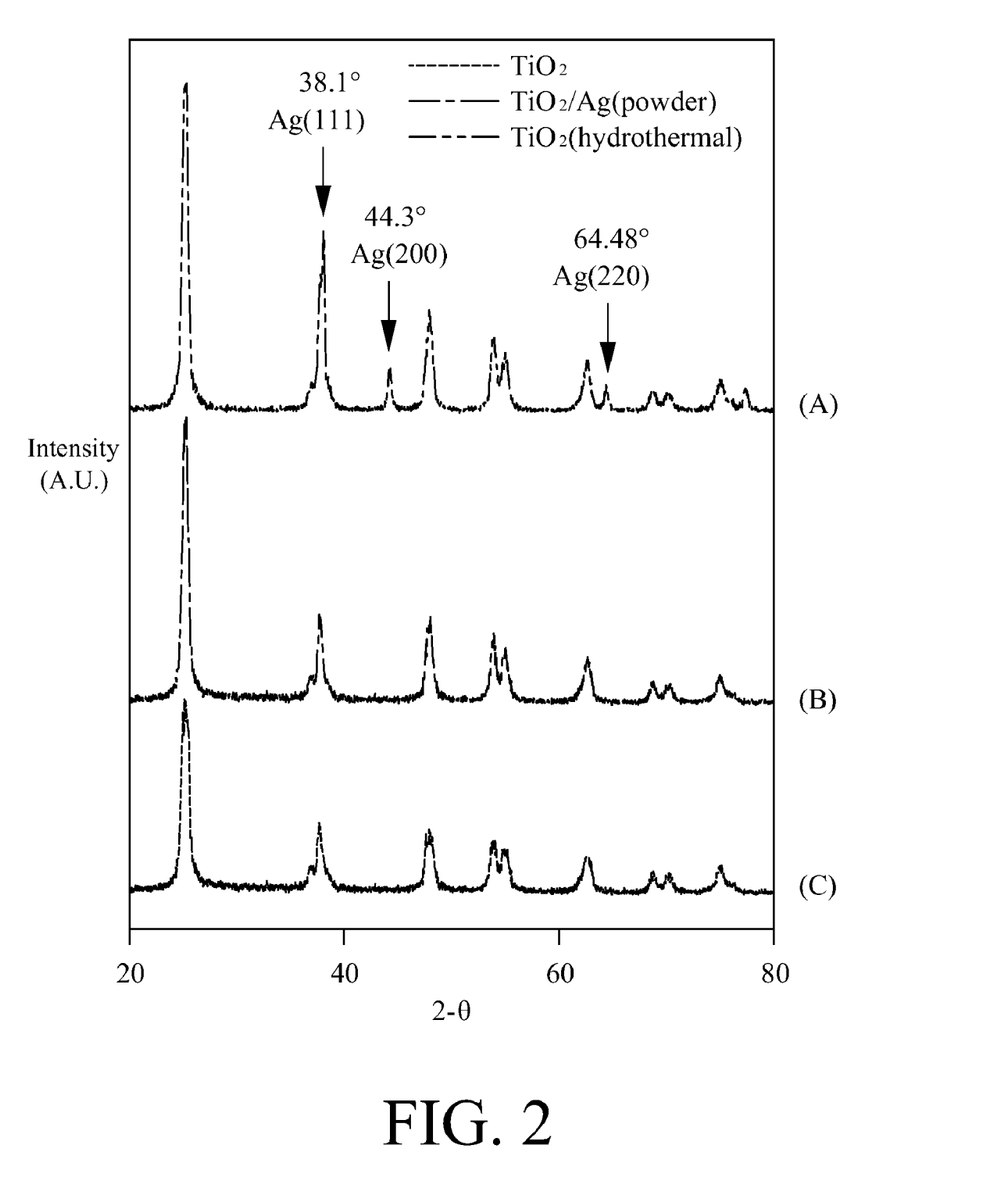
FIG. 2 is a schematic view comparing XRD spectra of photocatalysts prepared by three different means.

As shown in FIG. 2, it is a schematic view comparing XRD spectra of photocatalysts prepared by three different means. No. (A) is a XRD spectrum of the mono metal Ag/titania pulp prepared in Example 1 of the present invention; No. (B) is a XRD spectrum of a powder which is prepared with a simple titania pulp containing no metal Ag. The simple titania pulp is dried, ground into a powder, added into a solution formulated with 1 g of $AgNO_3$, soaked for 24 h at room temperature, and then dried and ground with a same method into a powder; and No. (C) is a XRD spectrum of a powder prepared by drying a simple titania pulp containing no metal Ag and then grinding. It can be found by comparing the three XRD spectra of (A), (B), and (C), that there is no obvious difference between (B) and (C), indicating weak binding between Ag and $TiO_2$ in the $Ag/TiO_2$ (No. (B)) made by soaking the prepared $TiO_2$ powder into the $AgNO_3$ solution; in contrast, it is observed from the XRD spectrum of $Ag/TiO_2$ powder of No. (A) prepared in Example 2 of the present invention that Ag peak is apparent, indicating excellent binding between Ag and $TiO_2$ in the $Ag/TiO_2$ powder prepared by the method of the present invention.

EXAMPLE 2

Preparation of Bismetal/Titania Pulp

In this example, a same scheme as that in Example 1 for making titania pulp was used, except that in the reaction process, two different metal salts were added together. 10 ml of iso-propanol was mixed with 37 ml of titanium ethoxide and placed into a 100 ml dropper. In addition, 80 ml of acetic acid was mixed with 250 ml of distilled water and placed into a 500 ml flask, which was then placed in a thermostatic bath with a temperature set at 5° C. Under nitrogen atmosphere, the mixed solution in the dropper above was dripped into the flask at a controlled rate of about two drops per second for 1 h with stirring at a constant rate. The titrated solution would appear clear, and if there were suspended substances, stirring was continued till a transparent solution was obtained. The titrated solution was placed into a thermostatic bath of 80° C. for 3 h, taken out and cooled, and then 1 g of $H_2PtCl_6$ and 1 g of $AgNO_3$ were added and mixed homogeneously to get a colloidal solution. The colloidal solution was put into an autoclave, maintained for 12 h in a high temperature oven of 190° C., and cooled to room temperature. The solution exhibited a liquid layer and a titania layer. The upper liquid layer was decanted to leave the Pt—Ag/titania layer, which was further stirred to get a Pt—Ag/titania pulp.

Figure 3:
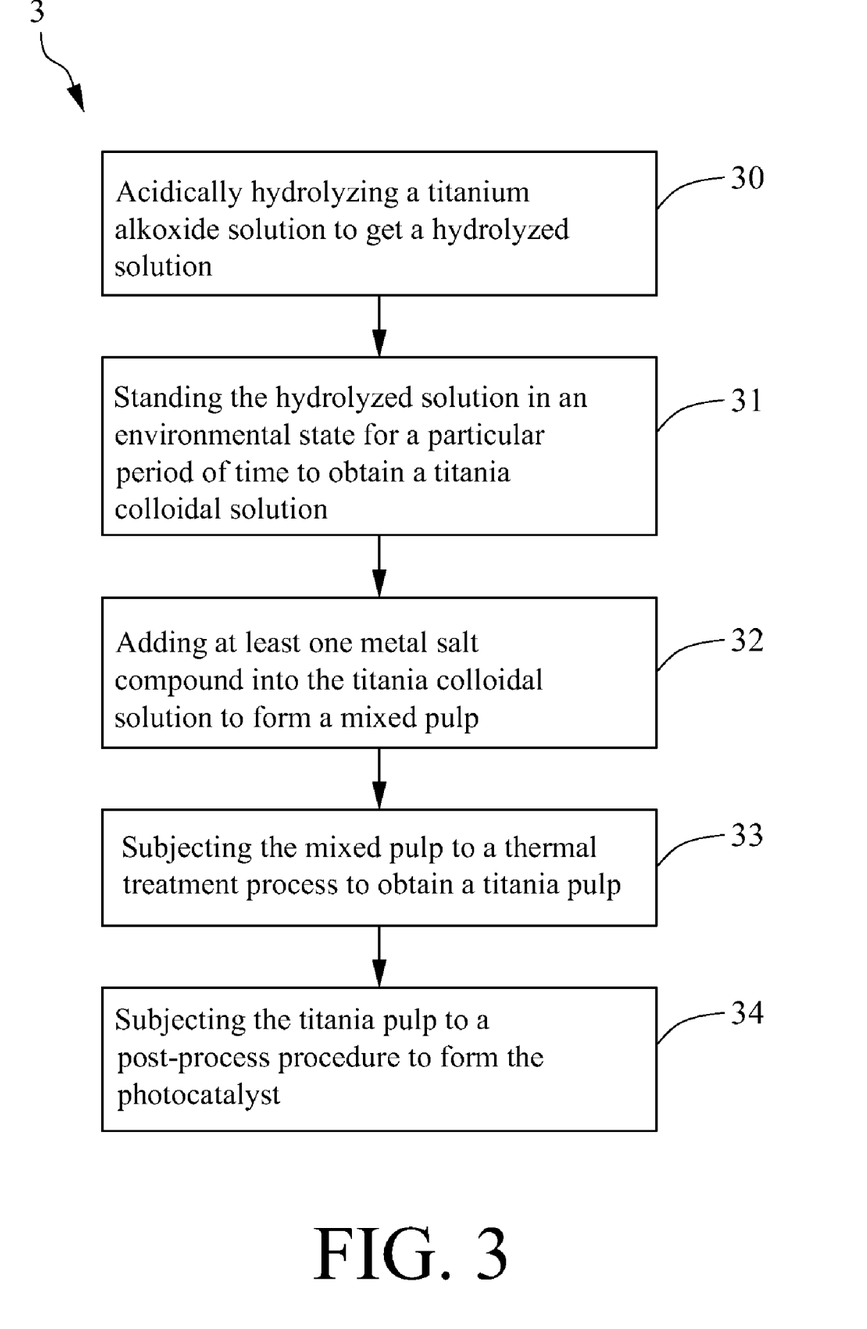
FIG. 3 is a schematic flow chart of a method for making a photocatalyst according to the present invention.

Referring to FIG. 3, it is a schematic flow chart of a method for making a photocatalyst according to the present invention. Steps 30 to 33 in the method 3 are procedures for making a metal/titania pulp, which are same as the steps 20 to 23 above and will not described here. Following the step 33, a step 34 is performed, in which the titania pulp is subject to a post-process procedure to form the photocatalyst. The post-process procedure can include further washing and drying the prepared pulp and then powdering, and the powdering process is known in prior art and will not be described here. The nano photocatalyst powder thus prepared can avoid decrease in reaction efficiency resulted from disassociation of the metal ions from the titania powder during the photo reaction process, because in the prepared nano metal/titania photocatalyst, the metal ions can more tightly bind to titania by entering into pores of titania powder, or by forming an effective bond to titania, since the metal salt compounds is added in the preparation process to starting raw materials required to synthesize the photocatalyst, such that the added metal ingredient can effectively bind to the starting reactants of the photocatalyst. This can improve a mixing method of generally directly dripping a solution of the metal ions into the synthesized titania powder, in which the metal ions are merely attached to surface of the titania powder via physical adsorption and binding strength between them is low, such that the reaction efficiency is decreased due to the possible disassociation of the metal ions from the titania powder during the photo reaction process.

Furthermore, in another embodiment, the post-process procedure also can include drying the metal/titania pulp and then grinding into a powder. Afterwards, a crystallization procedure is performed, in which the powder is calcinated to produce a titania powder in crystal form. Such a powder can be used as a good photocatalyst material due to its high porosity, high specific surface area, and excellent light absorption properties, and thus can be effectively used to improve hydrogen production effect by water decomposition with light.

EXAMPLE 3

Figure 4:
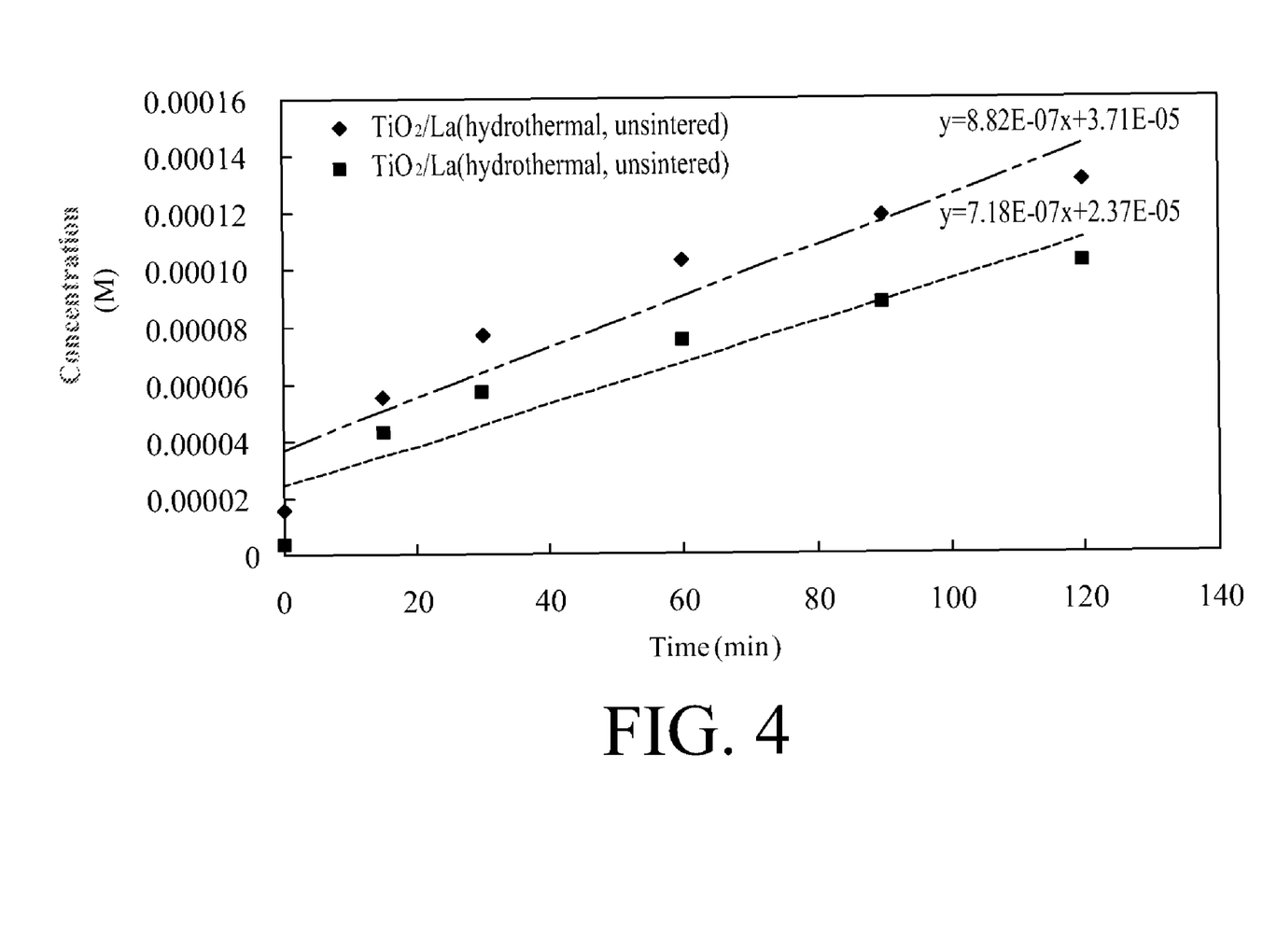
FIG. 4 is a graph of $I^{3-}$ concentration determined in a solution versus time.

Comparison of Photocatalytic Effect of Metal/Catalyst Pulp by High Temperature Calcination A same method as that in Example 1 was used to prepare a La/titania pulp, with exceptions that $LaNO_3$ was used in place of $AgNO_3$ as metal salt. The prepared $La/TiO_2$ pulp was washed with iso-propanol to remove residual impurities, then the remaining pulp was naturally dried in air (or evaporated to dryness with a water bath), taken out, placed into a mortar and ground into a powder (or ground into a powder with stirring in drying). Next, the ground powder was divided into two portions, one was directly stored for use, and an other was calcinated for 2 h in a high temperature oven of 400° C. and then cooled to room temperature; and a particle size analysis showed that a mean particle size of the two portions each was 50 to 250 nm. 0.05 g of the uncalcinated and calcinated La/titania powders above were separately added into 50 ml of 0.2 M solution of KI in water, and ultrasonated for 5 min in dark to uniformly disperse the metal/titania powder into the aqueous solution, at this time, a sample was taken as a solution concentration basis before reaction; then the La/titania dispersion was placed in an irradiation reaction system with a mercury lamp having a light intensity of 500 W and disposed 11 cm above the reaction solution, as light source, and the irradiation system was surrounded with a stainless housing to isolate from exterior, thereby interference of external light on the reaction system was eliminated; the mixed solution of $La/TiO_2/KI$ was stirred for 5 min firstly by starting a stirring system, and then subjected to a photochemical reaction by starting the light source; timing was initiated at this time, a suitable amount of reaction solution was sampled at reaction times of 15, 30, 60, 90, and 120 min respectively, a La/titania powder suspended therein was removed with a syringe filter or by high-speed centrifugation, and an upper liquid layer was collected and detected for absorption change at a wavelength of 350 nm using UV spectrum analysis. Herein, the photocatalytic activity of $La/TiO_2$ can be determined by change in adsorption intensity of $I^{3-}$ at a wavelength of 350 nm in UV spectrum, in which the $I^{3-}$ is formed by in the mixed solution system of $La/TiO_2/KI$ oxidation of $I^-$ ions in the solution by $La/TiO_2$ after irradiation and further reaction to produce $I^{3-}$. Referring to FIG. 4, it is a graph of $I^{3-}$ concentration determined in a solution versus time. It can be known from the figure that $I^{3-}$ concentration increases with irradiation time, suggesting that the $La/TiO_2$ prepared by the method of the present invention is of good photocatalytic activity, and the photocatalytic activity of the uncalcinated $La/TiO_2$ is better than that of the calcinated $La/TiO_2$, suggesting that the metal/$TiO_2$ pulp or powder prepared by the method of the present invention can has excellent optical activity without high temperature treatment, so the cost resulted from high temperature treatment can be avoided.

Hereinafter, a practical embodiment is provided to compare property differences between a Pt/titania powder made in the present invention and a commercially available titania powder added with Pt:

EXAMPLE 4

Comparison of Photocatalytic Effect of Pt/Titania Powders Made by Different Preparation Methods Firstly, a titania pulp was prepared with a same method as that in Example 1, and then washed with iso-propanol to remove residual impurities; next, the remaining pulp was naturally dried in air (or evaporated to dryness with a water bath), taken out, placed into a mortar and ground into a powder (or ground into a powder while stirring); then, the ground powder was calcinated for 2 h in a high temperature oven of 400° C. and then cooled to room temperature for use (No. A). In addition, a Pt/titania pulp was prepared with a same method as that in Example 2, with exceptions that $H_2PtCl_6$ was used in place of $AgNO_3$ as metal salt; the prepared $Pt/TiO_2$ pulp was washed with iso-propanol to remove residual impurities, then the remaining pulp was naturally dried in air (or evaporated to dryness with a water bath), taken out, placed into a mortar and ground into a powder (or ground into a powder while stirring); next, the ground powder was calcinated for 2 h in a high temperature oven of 400° C. and then cooled to room temperature for use (No. B). Finally, a suitable amount (equivalent to that of No. A by weight) of commercially available Degussa P25 titania powder was added into a solution formulated with 1 g of $H_2PtCl_6$, soaked for 24 h at room temperature, then evaporated to dryness with a water bath and ground into a powder; next the ground powder was calcinated for 2 h in a high temperature oven of 400° C. and then cooled to room temperature for use (No. C). 0.05 g of each of the powders made by the three different methods above was added into 50 ml of 0.2 M aqueous KI solution, separately subjected to irradiation reaction with a same reaction process and irradiation system as those in Example 3, and sampled for analysis to compare the photocatalytic effect of the three different titania powders, (A), (B), and (C).

As shown in table 2, $I^{3-}$ concentrations produced by the different titania powders at different times after irradiation are shown. By comparing the $I^{3-}$ concentrations produced by the three titania powders at different times after irradiation, it is found the formula (B)>(C)>(A) is met, suggesting that the Pt/titania powder (B) prepared by the method of the present invention has the highest photocatalytic activity, which is higher than that of commercially available Degussa P25 nano titania powder (C) added with Pt.

TABLE 2

Comparison of Photocatalytic Effect of Pt/titania Powders on KI in Solution

| Irradiation Time (min) | $I^{3-}$ Concentration Produced (M) × $10^{-4}$ | | |
|---|---|---|---|
| | (A) | (B) | (C) |
| 0 | 0 | 0 | 0 |
| 15 | 0.050 | 0.184 | 0.142 |
| 30 | 0.072 | 0.220 | 0.152 |
| 60 | 0.083 | 0.272 | 0.158 |
| 90 | 0.115 | 0.285 | 0.163 |
| 120 | 0.128 | 0.304 | 0.173 |
| 180 | 0.137 | 0.373 | 0.185 |

ε: molar extinction coefficient = 2.63 × $10^4$ ($dm^3$/cm mole)

Referring back to FIG. 3, the post-process procedure also can include directly applying onto a transparent substrate to prepare a transparent and very fine nano metal/titania film. The film formed by applying a metal/titania pulp made by the method of the present invention can have very excellent hardness and good adhesion to substrate after being dried at room temperature to 200° C. without high-temperature calcination (>400° C.), and is determined to have a pencil hardness ranging from 3B to 6H. A film formed by coating a pulp formulated with a commercially available titania powder (e.g. Degussa P25) onto an ITO conductive glass is determined to only have a pencil hardness of 2B. Generally, the film hardness will affect the adhesion between the film and the conductive substrate, and the adhesion is in turn associated with conversion efficiency of light energy. The adhesion between the film and the conductive substrate tends to be better with increase of the film hardness, so does the conversion efficiency of light energy. Therefore, a metal/titania pulp prepared by the method of the present invention can improve disadvantages in preparation of a film with a commercially available titania powder, such as high reaction temperature, complex process, poor adhesion to substrate, and too expensive raw materials, and meets requirements of low cost and high benefit in industry. Moreover, the formed metal/titania film substrate has very excellent optical activity, and is applicable in improving hydrogen production efficiency by water decomposition with light. Due to adhesion to a substrate surface to form a film, the nano metal/titania as photocatalyst is not only easily recovered, but also can be repeatedly used, thereby decreasing cost.

In the post-process procedure of coating onto a substrate, the substrate is not specifically limited and can be, for example, but is not limited to, ITO conductive glass and FTO conductive glass. Furthermore, in the method for making a film substrate according to this embodiment, coating of the mixed pulp onto a substrate can be achieved by any coating process known in prior art, which is not specifically limited as long as it can achieve a desired film thickness, however, a well-known wet process is preferred, for example, spin coating, blade coating, and dip coating. The film prepared by the method for preparing a film substrate of the present invention has a thickness of about 5 to 40 μm, and preferably about 10 to 20 μm; a film particle size between 5 to 250 nm, and preferably between 15 to 150 nm; and a film hardness ranging from 2B to 6H pencil hardness.

Hereinafter, a scheme for making a film catalyst is described with a practical operation:

EXAMPLE 5

Preparation of Nano Metal/Titania Film Catalyst

A mono metal/titania pulp and a bismetal/titania pulp were prepared with same methods as those in Examples 2 and 3 above. Next, a suitable amount of the pulp catalyst above was uniformly applied onto a FTO conductive glass substrate by blade coating, and then the substrate was naturally dried at room temperature for at least 3 to 8 h, and most preferably 5 h, calcinated for 0.5 to 1 h in a high temperature oven of 450° C. to 500° C., and then cooled to room temperature, such that a fine and transparent film was formed on the surface of the FTO substrate. Such a film has a very excellent adhesion with the substrate; a film thickness of about 5 to 40 μm, and preferably about 10 to 20 μm; a film particle size between 5 and 100 nm, and preferably between 15 and 50 nm; and a film hardness ranging from 2B to 6H pencil hardness. The catalyst film is useful as a photocatalyst required by photochemical reaction, and also applicable in energy industry, for example, hydrogen energy production by water decomposition, and due to adhesion to a substrate surface to form a film, the nano metal/titania as photocatalyst is not only easily recovered, but also can be repeatedly used, thereby decreasing cost.

Figure 5:
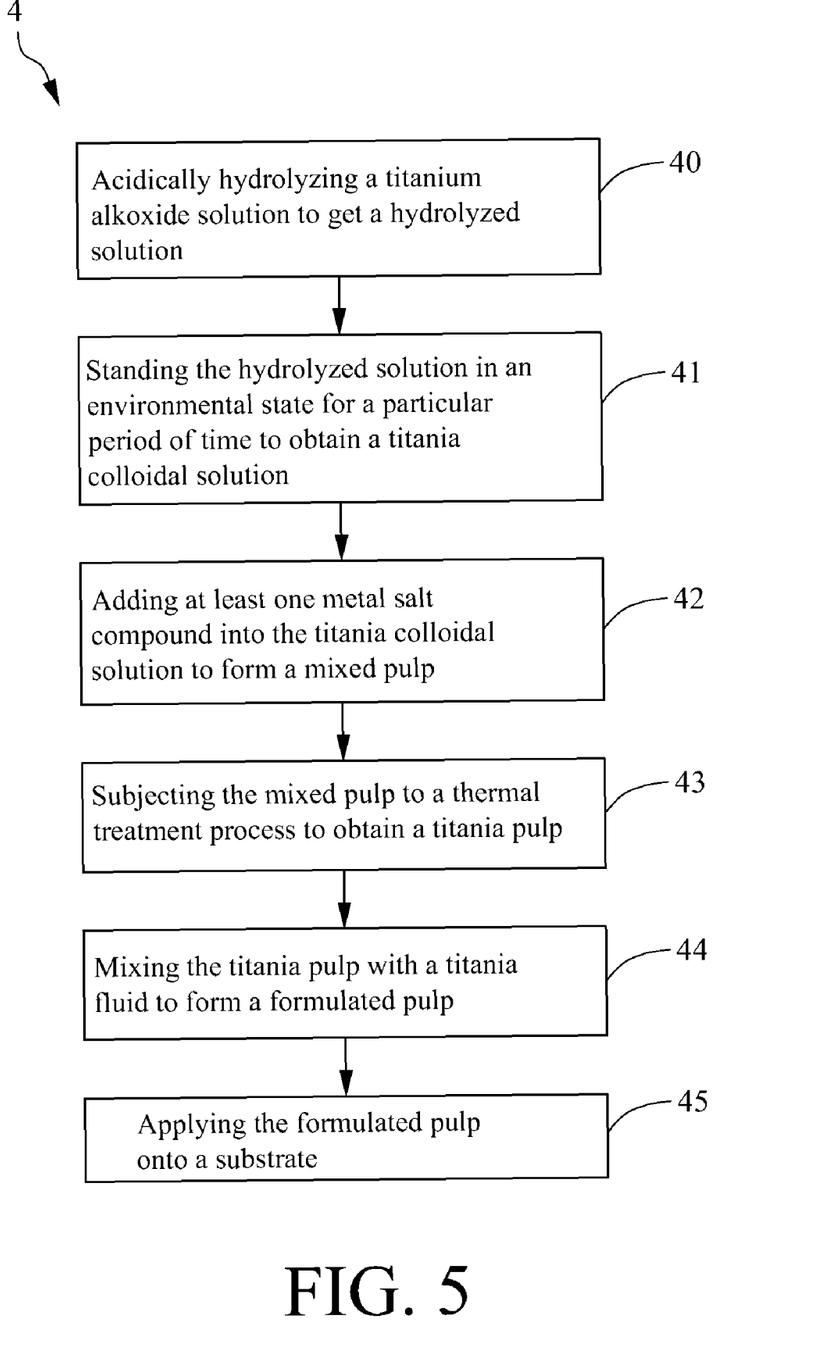
FIG. 5 is a schematic flow chart of a further method embodiment for making a photocatalyst according to the present invention.

Referring to FIG. 5, it is a schematic flow chart of a further method embodiment for making a photocatalyst according to the present invention. Procedures in steps 40 to 43 of the method 4 are same as those in FIG. 1A and will not described here. Following the step 43, a step 44 is performed, in which a formulated pulp is formed by mixing the titania pulp with a fluid obtained by adding a suitable binding agent and an optional suitable solvent to a commercially available titania powder. Afterwards, a step 45 is performed, in which the pulp is coated onto a substrate to form a photocatalyst film. In another embodiment, optionally the substrate coated with the pulp may be further subjected to a thermal treatment, i.e. the substrate is calcinated at 300 to 600° C. for 15 min to 2 h to form a film in this embodiment. The commercially available titania powder used in the step 44 of the present invention is not specifically limited, as long as it is a commercially available nano grade titania powder, for example, Degussa P25, ISK STS-01, and Hombikat UV-100.

Moreover, the binding agent and amount thereof used in the method for making a mixed pulp and film substrate of the present invention are not specifically limited, and can be determined by persons of skill in the art depending on type of the commercially available titania powder and addition amount of the metal/titania pulp prepared following the method of the present invention. Examples of the binding agent include acetylacetone, polyethylene glycol having a molecular weight of 400 to 50000, Triton X-100, polyvinyl alcohol (PVA), Acacia gum powder, gelatin powder, polyvinylpyrrolidone (PVP), styrene, and a like, with acetylacetone, polyethylene glycol having a molecular weight of 400 to 50000, and Triton X-100 being preferred. Furthermore, type of solvent and amount thereof used in the step 44 can be determined by persons of skill in the art depending on type of the commercially available titania powder and addition amount of the titania pulp prepared following the method of the present invention, and water is generally used. In addition, the metal/titania pulp prepared following the method of the present invention is mixed with the commercially available titania powder at an amount of 10 to 90 wt %, and preferably 10 to 30 wt %.

EXAMPLE 6

Preparation of Mixed Nano Metal/Titania Pulp and Film

A mono metal/titania pulp and a bismetal/titania pulp were prepared with same methods as those in Examples 1 and 2 above, and then mixed and ground at an amount of 30 to 95 wt % with a commercially available titania powder (e.g. Degussa P25) in a mortar for 10 to 20 min, such that an uniformly mixed pulp was formed. It is preferred that they were mixed with the commercially available titania powder at an amount of 60 to 90 wt %, and then applied onto a substrate using a same method as above to form a film. Furthermore, a small amount of a binding agent may be added such that the formed film has better binding capability with the substrate, and the binding agent and amount thereof are not specifically limited and can be determined by persons of skill in the art depending on type of the commercially available titania powder and addition amount of the titania pulp prepared following the method of the present invention. Examples of the binding agent include acetylacetone, polyethylene glycol having a molecular weight of 400 to 50000, Triton X-100, polyvinyl alcohol (PVA), Acacia gum powder, gelatin powder, polyvinylpyrrolidone (PVP), styrene, and a like, with acetylacetone, polyethylene glycol having a molecular weight of 400 to 50000, and Triton X-100 being preferred. Herein, the used substrate is not specifically limited, and can be a conductive substrate or any other material, for example, ITO conductive glass, FTO conductive glass, fiber, or metal. Furthermore, the shape of the substrate is not limited and can be, for example, plate-, disc-, or line-like. Means by which the pulp is coated onto a substrate, can be any coating process known in prior art, and is not specifically limited as long as it can achieve a desired film thickness, however, a wet process is preferred, for example, spin coating, blade coating, and dip coating. The thermal treatment can include, but is not limited to, calcinating at a temperature of 450 to 500° C. for 30 min to 1 h to make a film, and different thermal treatment conditions can be set by those of skill in the art, as desired.

EXAMPLE 7

Effect of Pt/Titania Catalyst on Hydrogen Production by Water Decomposition

A Pt/titania pulp was prepared with a same method as that in Example 1, except that $H_2PtCl_6$ was used in place of $AgNO_3$ as metal salt. The preparation method was as follows. 10 ml of iso-propanol was mixed with 37 ml of titanium ethoxide and placed into a 100 ml dropper. In addition, 80 ml of acetic acid was mixed with 250 ml of distilled water and placed into a 500 ml flask, which was then placed in a thermostatic bath with a temperature set at 5° C. Under nitrogen atmosphere, the mixed solution in the dropper above was dripped into the flask at a controlled rate of about two drops per second for 1 h with stirring at a constant rate. The titrated solution would appear clear, and if there were suspended substances, stirring was continued till a transparent solution was obtained. The titrated solution was placed into a thermostatic bath of 80° C. for 3 h, taken out and cooled, and then 1 g of $H_2PtCl_6$ was added and mixed homogeneously to get a colloidal solution. The colloidal solution was put into an autoclave, and maintained for 12 h in a high temperature oven of 190° C., and then cooled to room temperature. The solution exhibited a liquid layer and a titania layer. The upper liquid layer was decanted to leave the $Pt/TiO_2$ layer, which was further stirred to get a $Pt/TiO_2$ pulp. Then, the prepared $Pt/TiO_2$ pulp was washed with iso-propanol to remove residual impurities; next, the remaining pulp was naturally dried in air (or evaporated to dryness with a water bath), taken out, placed into a mortar and ground into a powder (or ground into a powder while stirring); next the ground powder was calcinated for 2 h in a high temperature oven of 400° C. and then cooled to room temperature for use (No. A). In addition, a suitable amount (equivalent to that of No. A by weight) of commercially available Degussa P25 titania powder was added into a solution formulated with 1 g of $H_2PtCl_6$, soaked for 24 h at room temperature, then evaporated to dryness with a water bath and ground into a powder; next the ground powder was calcinated for 2 h in a high temperature oven of 400° C. and then cooled to room temperature for use (No. B). Finally, an amount (equivalent to that of No. A by weight) of a commercially available Degussa P25 titania powder alone (No. C) was weighted for use.

0.5 g of each of the three different powders above was separately added into three bottles of 600 ml deionized water, and placed in a 800 ml reactor containing 0.57 M ethanol; then the solution was bubbled with nitrogen to remove oxygen contained therein, and stirred in a water bath of 15° C. until it became uniform; next, the solution was first tested for gas components by gas chromatography to ensure that no oxygen was present in the solution; afterwards, a mercury lamp of 400 W was started for irradiation for 12 h, during which a reaction gas was sampled every 3 minutes and analyzed for components contained therein. Referring to FIG. 5, it shows an experiment apparatus used for hydrogen production by water decomposition with light. Effects of the titania powders (A), (B), and (C) on hydrogen production by water decomposition with light were compared by sampling for analysis. Results are shown in table 3.

TABLE 3

Comparison of Effects of Pt/Titania Catalyst Made with Different Methods on Hydrogen Production by Water Decomposition with Light

| Catalyst | Solution Volume and Composition | Hydrogen Yield ($\mu$mole/g) |
|---|---|---|
| (A) $TiO_2$/3 wt % Pt | 600 ml ($H_2O$ + 0.57 M EtOH) | 93.25 |
| (B) P25/3 wt % Pt | 600 ml ($H_2O$ + 0.57 M EtOH) | 45.39 |
| (C) P25 | 600 ml ($H_2O$ + 0.57 M EtOH) | 0 |

As shown in the table, hydrogen production efficiencies meet (A)>(B)>(C), indicating that hydrogen production effect of water decomposition with light can be improved by means of a catalyst added with Pt, and hydrogen production effect achieved by the $Pt/TiO_2$ catalyst prepared by the method of the present invention is about 2 time higher that by the Pt/P25 catalyst made from a commercial product.

It should be understood that the descriptions above are merely embodiments of the present invention, and not intended to limit the scope of the present invention. Any equivalent modification and change made by following the teaching of the present invention should be included in the scope of the claims to be made by the present invention, without departing from the spirit and scope of the present invention, and therefore should be considered as further embodiments of the present invention.

In summary, the metal/titania pulp and photocatalyst made by the method provided by the present invention have very excellent optical activity, and are applicable in research of hydrogen production by water decomposition with light, thereby improving production efficiency of hydrogen energy resource. Furthermore, in the embodiments of the present invention, the catalyst is made in the form of powder or film to facilitate industrial application in water treatment. Thus, the methods of the present invention can provide the improvement of industry competitiveness and drive the development of relevant industry.

What is claimed is:

1. A method for making a metal/titania pulp, comprising:
   mixing a titanium alkoxide and an alcohol solvent to obtain a titanium alkoxide solution, dripping the mixed titanium alkoxide solution at about two drops per second and a 47 ml/hour dripping rate and stirring at a constant rate in an ice bath at a temperature of 3 to 10° C., and acidically hydrolyzing the titanium alkoxide solution under nitrogen atmosphere to get a hydrolyzed solution;
   standing the hydrolyzed solution at a temperature of 60 to 100° C. for 2 to 6 hours to obtain a titania colloidal solution;
   adding at least one metal salt compound into the titania colloidal solution to form a mixed pulp; and
   subjecting the mixed pulp to a thermal treatment process to get a titania pulp.

2. The method for making a metal/titania pulp according to claim 1, wherein the titanium alkoxide in the titanium alkoxide solution is selected from titanium alkoxides having 1 to 6 carbons.

3. The method for making a metal/titania pulp according to claim 1, wherein the alcohol solvent in the titanium alkoxide solution is an alkanol having 1 to 6 carbons.

4. The method for making a metal/titania pulp according to claim 1, wherein an acid used for the acidic hydrolysis is an organic or inorganic acid.

5. The method for making a metal/titania pulp according to claim 1, wherein a molar ratio of water to titanium alkoxide in the hydrolysis solution is controlled in the range of above 10 to 500 and a molar ratio of acid to titanium alkoxide is controlled in the range of above 0.1 to 2.

6. The method for making a metal/titania pulp according to claim 1, wherein the thermal treatment process comprises maintaining the hydrolyzed solution at a temperature of 130 to 300° C. for 10 to 24 h and then cooling.

7. The method for making a metal/titania pulp according to claim 1, wherein the thermal treatment process is performed in an autoclave.

8. A method for making a photocatalyst, comprising:
    mixing a titanium alkoxide and an alcohol solvent to obtain a titanium alkoxide solution, dripping the mixed titanium alkoxide solution at about two drops per second and a 47 ml/hour dripping rate and stirring at a constant rate in an ice bath at a temperature of 3 to 10° C., and acidically hydrolyzing the titanium alkoxide solution under nitrogen atmosphere to get a hydrolyzed solution;
    standing the hydrolyzed solution at a temperature of 60 to 100° C. for 2 to 6 hours to obtain a titania colloidal solution;
    adding at least one metal salt compound into the titania colloidal solution to form a mixed pulp;
    subjecting the mixed pulp to a thermal treatment process to get a titania pulp; and
    subjecting the titania pulp to a post-process procedure to form the photocatalyst.

9. The method for making a photocatalyst according to claim 8, wherein the titanium alkoxide in the titanium alkoxide solution is selected from titanium alkoxides having 1 to 6 carbons.

10. The method for making a photocatalyst according to claim 8, wherein the alcohol solvent in the titanium alkoxide solution is an alkanol having 1 to 6 carbons.

11. The method for making a photocatalyst according to claim 8, wherein an acid used for the acidic hydrolysis is an organic or inorganic acid.

12. The method for making a photocatalyst according to claim 8, wherein a molar ratio of water to titanium alkoxide in the hydrolysis solution is controlled in the range of above 10 to 500 and a molar ratio of acid to titanium alkoxide is controlled in the range of above 0.1 to 2.

13. The method for making a photocatalyst according to claim 8, wherein the thermal treatment process comprises maintaining the hydrolyzed solution at a temperature of 130 to 300° C. for 10 to 24 h and then cooling.

14. The method for making a photocatalyst according to claim 8, wherein the post-process procedure comprises drying the titania pulp and powdering.

15. The method for making a photocatalyst according to claim 14, further comprising a step of subjecting the powder to a crystallization procedure.

16. The method for making a photocatalyst according to claim 8, wherein the post-process procedure comprises applying the titania pulp onto a substrate.

17. The method for making a photocatalyst according to claim 8, wherein the thermal treatment process is performed in an autoclave.

18. A method for making a photocatalyst, comprising:
    mixing a titanium alkoxide and an alcohol solvent to obtain a titanium alkoxide solution, dripping the mixed titanium alkoxide solution at about two drops per second and a 47 ml/hour dripping rate and stirring at a constant rate in an ice bath at a temperature of 3 to 10° C., and acidically hydrolyzing the titanium alkoxide solution under nitrogen atmosphere to get a hydrolyzed solution;
    standing the hydrolyzed solution at a temperature of 60 to 100° C. for 2 to 6 hours to obtain a titania colloidal solution;
    adding at least one metal salt compound into the titania colloidal solution to form a mixed pulp;
    subjecting the mixed pulp to a thermal treatment process to get a titania pulp;
    mixing the titania pulp with a titania fluid to form a formulated pulp; and
    applying the formulated pulp onto a substrate.

19. The method for making a photocatalyst according to claim 18, wherein the titanium alkoxide in the titanium alkoxide solution is selected from titanium alkoxides having 1 to 6 carbons.

20. The method for making a photocatalyst according to claim 18, wherein the alcohol solvent in the titanium alkoxide solution is an alkanol having 1 to 6 carbons.

21. The method for making a photocatalyst according to claim 18, wherein an acid used for the acidic hydrolysis is an organic or inorganic acid.

22. The method for making a photocatalyst according to claim 18, wherein a molar ratio of water to titanium alkoxide in the hydrolysis solution is controlled in the range of above 10 to 500 and a molar ratio of acid to titanium alkoxide is controlled in the range of above 0.1 to 2.

23. The method for making a photocatalyst according to claim 18, wherein the thermal treatment process comprises maintaining the hydrolyzed solution at a temperature of 130 to 300° C. for 10 to 24 h and then cooling.

24. The method for making a photocatalyst according to claim 18, further comprising a step of subjecting the substrate applied with the formulated pulp to a thermal treatment.

25. The method for making a photocatalyst according to claim 18, wherein the thermal treatment process is performed in an autoclave.

* * * * *